June 14, 1966   R. E. SHIPMAN   3,256,451
HYDRODYNAMIC BEARINGS IN A MOTOR
Filed Feb. 15, 1963   2 Sheets-Sheet 1

FIG. I.

INVENTOR
Raldo E. Shipman

By J. Hanson Boyden

ATTORNEY

INVENTOR
Raldo E. Shipman

United States Patent Office
3,256,451
Patented June 14, 1966

3,256,451
HYDRODYNAMIC BEARINGS IN A MOTOR
Raldo E. Shipman, Sunbury, Pa., assignor to Forgflo Corporation, Sunbury, Pa., a corporation of Pennsylvania
Filed Feb. 15, 1963, Ser. No. 258,753
4 Claims. (Cl. 310—90)

This invention relates to a motor and bearing assembly, and more particularly to an assembly in which the motor shaft is journaled adjacent each end in spherical air bearings.

Each spherical air bearing includes a rotatable member secured to the shaft and having a peripheral surface comprising a spherical zone, and a socket member having a matching internal spherical surface in which said rotatable member turns, and means for forming a film of air under pressure between said spherical surfaces.

The primary object of this invention is to provide a bearing and assembly of the kind referred to which is especially advantageous in precision apparatus for supporting shafts which are driven at high speed and which must be maintained accurately on a fixed axis of rotation under all conditions.

Another object is to so design the spherical bearings that they may be readily machined and assembled with a minimum of expense.

With the above and other objects in view, and to improve generally on the details of such apparatus, the invention consists in the construction and arrangement of parts hereinafter described and claimed, and illustrated in the accompanying drawings, forming part of this specification, and in which:

Figure 1:
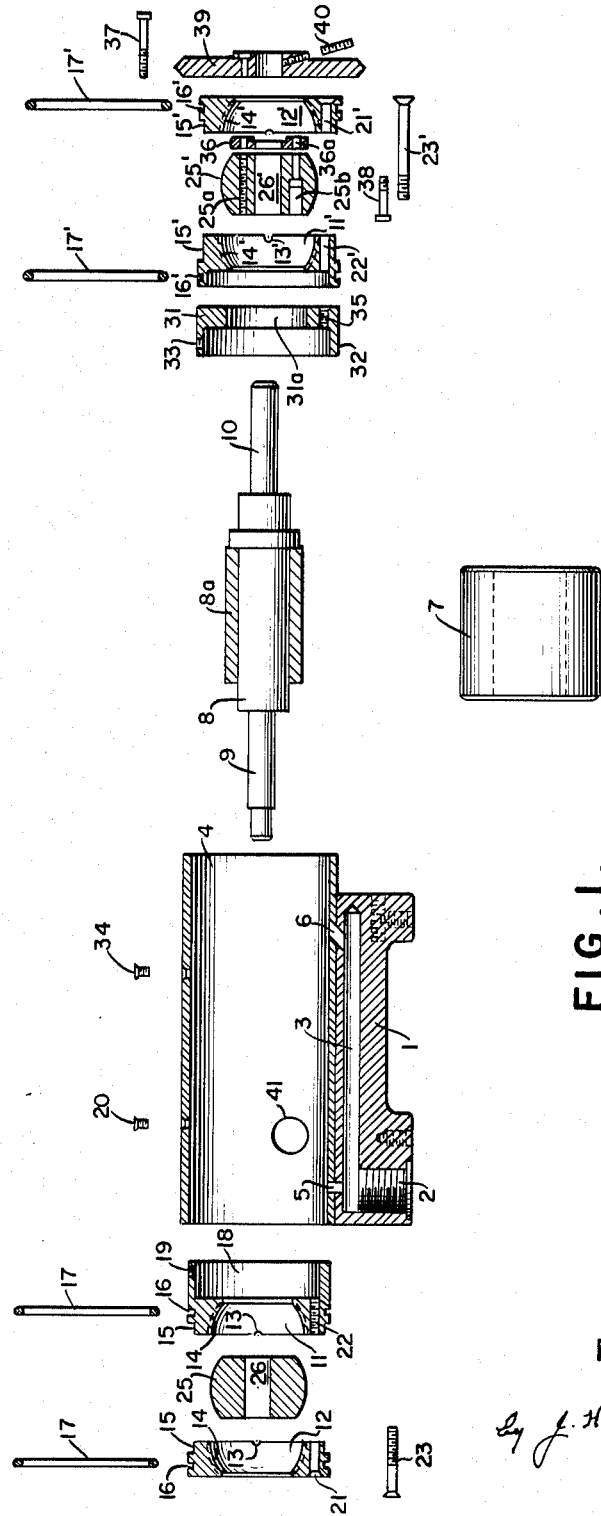
FIG. 1 is an "exploded" view of the parts making up the invention.

Referring to the drawings in detail, my improved motor and bearing assembly comprises a frame 1 having a socket 2 and a longitudinally extending air passage 3 provided with inwardly directed ports 5 and 6.

Figure 2:
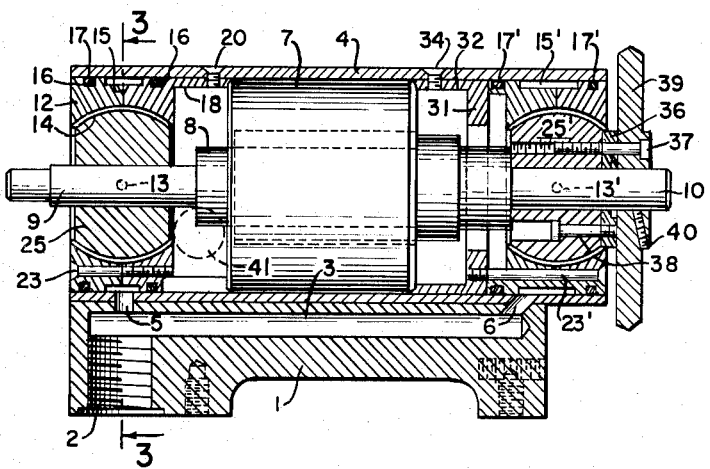
FIG. 2 is a longitudinal section through a complete assembly, parts being shown in elevation.
Figure 3:
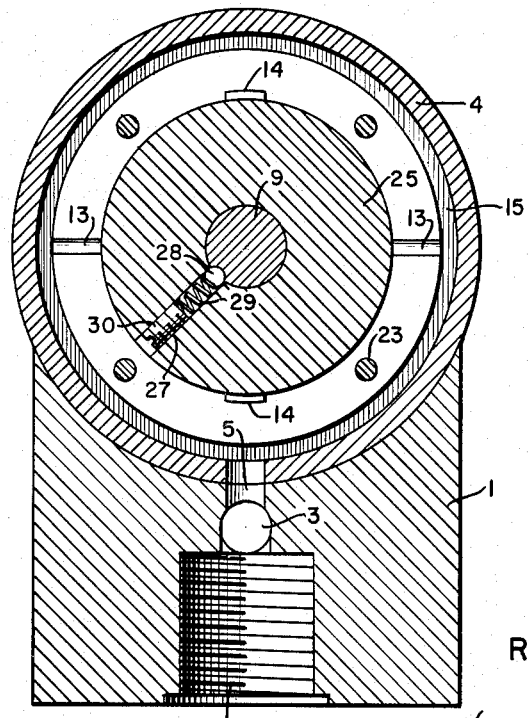
FIG. 3 is a transverse section on an enlarged scale taken substantially on the line 3—3 of FIG. 2, looking in the direction of the arrows.

A cylindrical shell or casing 4 is mounted on the frame 1, as shown in FIGS. 2 and 3.

Mounted within the shell 4 is the stator 7 of an electric motor of any suitable type. This stator has on its inner face suitable windings (not shown), the leads to such windings passing out through an opening 41 formed in the shell.

The motor is shown as having an armature or rotor 8 provided with a special outer body 8ᵃ, as shown in FIG. 1, the rotor having a shaft the ends of which are designated 9 and 10. These shaft ends are supported in special bearings which will now be described.

At the left-hand end 9 there is provided a socket member formed of two halves 11 and 12 formed with a spherical inner surface. The two halves of the socket member are preferably divided on a central plane extending transversely of the axis of the motor shaft. Two or more radially disposed air passages 13 formed partly in each of the socket halves 11 and 12 are provided. These passages 13 extend from the inner surface of the spherical socket members to an annular channel 15, closed on its outer side by the shell or casing 4. This channel 15 communicates with the port 5 as clearly shown in FIG. 2.

On the inner spherical surface of the socket member are also formed a plurality of grooves 14. These grooves are shown as lying substantially in the plane of the rotor axis, and, as shown in FIG. 3, they are spaced angularly a substantial distance from the passages 13. As illustrated in FIG. 3, there are two such grooves 14 and two air passages 13, these grooves and passages being located 90 degrees from each other.

The outer periphery of the halves 11 and 12 of the socket member is provided with annular grooves 16, within which grooves fit O-rings 17, so as to form an airtight seal between the periphery of the socket members and the shell or casing 4.

The socket member 11 has an axially extending flange 18 which lies in contact with the shell 4 and is secured thereto by means of a screw 20 passing through the shell and into a hole 19 in the flange 18.

The two halves 11 and 12 of the socket member are held together by screws 23 passing through openings 21 in the member 12 and engaging threaded openings 22 in the member 11.

Secured to the end 9 of the rotor shaft is a rotatable member 25 having a central opening 26 which snugly fits the shaft end 9. This rotatable member has a peripheral surface comprising a spherical zone symmetrically disposed about a central transverse plane where its diameter is a maximum. This spherical zone matches the inner spherical surface of the socket members 11 and 12 and is enclosed within these socket members as clearly shown in FIG. 2.

Preferably, the rotatable member 25 is secured to the shaft end 9 so as to rotate therewith but is capable of sliding thereon. To this end a radial bore 27 is formed in the rotatable member 25 and a longitudinal groove or keyway is formed in the shaft end 9. A ball 28 pressed by a spring 29 enclosed within the bore 27 and adjustably held by means of a screw 30 engages the groove or keyway in the shaft, all as clearly shown in FIG. 3.

At the right-hand end of the assembly I provide an annular member 31 having a peripheral flange 32 in contact with the inner surface of the shell 4, this flange having a threaded opening 33 in which engages a screw 34 passing through the shell, thus securing the member 31 and shell rigidly together. A spherical bearing is also provided at this end of the assembly, and comprises socket members 11' and 12' enclosing a rotatable member 25' having a peripheral surface comprising a spherical zone, enclosed within the socket members. As previously described in connection with the left-hand end of the assembly, a plurality of radial ports 13' are formed between the meeting faces of the socket members 11' and 12' and grooves 14' are formed in the inner face of the spherical surface of the socket members. The rotatable member 25' is provided with a central opening 26' which tightly fits the end 10 of the rotor shaft. The socket members 11' and 12' are held together with screws 23' passing through openings 21' in the member 12', openings 22' in the member 11' and engaging threaded openings 35 in the member 31.

An annular channel 15' surrounds the socket members 11' and 12', as at the left-hand side of the assembly, and these members are also formed with annular grooves 16' in which fit O-rings 17'.

Also secured to the end of shaft 10 is a disc or other driven member 39. This member is preferably provided near its center with a radially disposed screw 40 which may be adjusted in and out of a threaded socket so as to dynamically balance the disc 39.

Interposed between the rotatable member 25' and this disc 39 is a spacing member 36. The disc 39 is held to the rotatable member 25' by means of screws 37 passing through the disc and through the spacing member 36 and engaging a threaded opening in the rotatable member 25', and an additional screw 38 is received in a socket 25ᵇ and engages a threaded opening 36ᵃ in the spacing member 36, as clearly shown in FIG. 2.

It is desirable to have the rotatable member 25' rigidly fixed to the shaft end 10. This is preferably accomplished by means of a thermo-shrink fit, by either heating the spherical member or chilling the shaft, and assembling. Thus, the spherical member becomes practically an integral part of the shaft. The rotatable member 25 at the left-hand side of the assembly, on the other hand, is capable of sliding movement on the shaft end 9.

It will be noted that the socket members at both ends of the assembly are rigidly secured to the casing 4, while the spherical rotatable members 25 and 25' are carried by the shaft. If both of these members were rigidly mounted on the shaft, there would be the possibility that, owing to the unequal expansion of the shaft and casing, the rotatable members might be displaced slightly axially relative to the socket members, with the result that the air film between the mating spherical surfaces would no longer be of uniform thickness, and there would be a tendency for the bearings to bind. To avoid this, and compensate for any such above mentioned unequal expansion of the shaft and casing, the rotatable member 25 at the left end of the shaft is so mounted as to be capable of sliding relative to the shaft, as heretofore described.

In operation, air under pressure is delivered to the socket 2 as by means of a hose and thence passes through the passage 3 and ports 5 and 6 into the annular channels 15 and 15'. From these channels the air flows radially inward through the passages 13 to the meeting spherical surfaces of the sockets and rotatable members 25 and 25', thus forming a film of air under pressure between these spherical surfaces. The grooves 14 and 14' provide means for controlling turbulence and air film distribution, and also provide an exit for any foreign material which may be admitted with the air. It will be noted that the ends of these grooves 14 are open to atmosphere on either side of the rotatable member, so that the air fed through the passages 13 may escape.

What I claim is:

1. An air bearing and motor assembly comprising a shaft having at each end a rotatable member having a peripheral surface including a spherical zone, an electric motor rotor secured to said shaft at a point between said rotatable members, a casing, a stator supported in said casing, and co-operating with said rotor, a socket member having an internal spherical surface matching that of said rotatable member enclosing each rotatable member, said socket members being rigidly supported in said casing at a fixed distance apart, and means for introducing air under pressure between the spherical surfaces of said rotatable and socket members, the rotatable member at one end of the shaft being fixed to the shaft, while the rotatable member at the other end of the shaft is slidably but non-rotatively secured to said shaft.

2. An assembly in accordance with claim 1, in which the means for securing the rotatable member slidably but non-rotatively to the shaft comprises a radial bore formed in said member, a ball disposed in the inner end of said bore, a compression spring in said bore bearing against said ball to urge it inwardly, and a groove extending longitudinally of said shaft, in which groove said ball is received.

3. A motor and bearing assembly comprising a base, a cylindrical casing supported thereon, an electric motor stator supported co-axially in said casing, a rotor within said stator, a shaft on which said rotor is mounted and by which it is driven, both said shaft and casing extending axially well beyond said stator in both directions, a rotatable member having a peripheral surface comprising a spherical zone secured to each end of said shaft, a socket member having an external cylindrical surface and an internal spherical surface matching that of said rotatable member enclosing each rotatable member, the cylindrical surface of said socket members fitting snugly within opposite ends of said casing and rigidly secured thereto to close the same, and means for introducing air under pressure between the spherical surfaces of said rotatable and socket members.

4. An air bearing including, in combination, a rotatable member having a peripheral surface comprising a spherical zone symmetrically disposed about a central transverse plane where its diameter is a maximum, and a socket member having a matching internal spherical surface surrounding said rotatable member, said socket member being formed with an external circumferential groove lying in said central transverse plane, a casing overlying and closing the outside of said groove to form an annular channel, unobstructed radial air passages extending inwardly from said channel to the meeting surfaces of said rotatable and socket members, a conduit for supplying air under pressure to said annular channel, and a groove formed in the spherical surface of said socket member and said groove lying in the plane which includes the axis of rotation of said rotatable member, said groove having its ends open to atmosphere, and being angularly spaced a substantial distance from any of said radial air passages.

References Cited by the Examiner

UNITED STATES PATENTS

| 2,488,775 | 11/1949 | Heim | 308—72 |
| 2,663,977 | 12/1953 | Gerard | 308—9 |
| 2,711,352 | 6/1955 | Hasko | 308—72 |
| 2,998,999 | 9/1961 | Morser | 308—122 |
| 3,016,273 | 1/1962 | Benoit | 308—9 |
| 3,118,384 | 1/1964 | Sence | 308—122 |

FOREIGN PATENTS 1,070,883  12/1959  Germany.

ORIS L. RADER, *Primary Examiner.*

MILTON O. HIRSHFIELD, *Examiner.*

J. W. GIBBS, *Assistant Examiner.*